(12) United States Patent
Kim

(10) Patent No.: US 8,514,901 B2
(45) Date of Patent: Aug. 20, 2013

(54) SILICON-BASED COOLING PACKAGE FOR LASER GAIN MEDIUM

(76) Inventor: Gerald Ho Kim, Carlsbad, CA (US)

( * ) Notice: Subject to any disclaimer, the term of this patent is extended or adjusted under 35 U.S.C. 154(b) by 1 day.

(21) Appl. No.: 13/286,992

(22) Filed: Nov. 1, 2011

(65) Prior Publication Data

US 2012/0103569 A1    May 3, 2012

Related U.S. Application Data

(60) Provisional application No. 61/409,211, filed on Nov. 2, 2010.

(51) Int. Cl.
*H01S 3/00* (2006.01)

(52) U.S. Cl.
USPC ............ 372/34; 372/35; 372/67; 372/33; 372/36; 372/39; 165/104.11; 165/104.34; 165/80.4; 165/908; 362/326; 362/365; 362/373; 361/699

(58) Field of Classification Search
USPC ............ 372/34, 35, 67; 165/104.11, 104.34
See application file for complete search history.

(56) References Cited

U.S. PATENT DOCUMENTS

| | | | |
|---|---|---|---|
| 5,727,618 A * | 3/1998 | Mundinger et al. | 165/80.4 |
| 2002/0110166 A1 * | 8/2002 | Filgas | 372/36 |
| 2005/0047456 A1 * | 3/2005 | Rice | 372/35 |
| 2005/0094689 A1 * | 5/2005 | Ludewigt | 372/36 |
| 2006/0108098 A1 * | 5/2006 | Stevanovic et al. | 165/80.4 |
| 2012/0090816 A1 * | 4/2012 | Bayazitoglu et al. | 165/72 |
| 2012/0250719 A1 * | 10/2012 | Hodgson et al. | 372/70 |

OTHER PUBLICATIONS

Mudinger, D., Beach, R., Benett, W., Solarz, R., Krupke. SDtaver R., and Tuckerman, D. Demonstration of High Performance Silicon Microchannel Heat Exchangers for Laser Diode Array Cooling, Appl. Phys. Lett 55(12), Sep. 19, 1988.*
Tuckerman. D. B. and Pease, R. F. W.High-Performance Heat Sinking for VLSI, IEEE Electronic Device Letters 2(5), May 1981.*
McGraw-Hill Dictionary of Scientific and Technical Terms, Fifth Edition, 1993 p. 912.*

* cited by examiner

*Primary Examiner* — Jessica Stultz
*Assistant Examiner* — Brian Riely
(74) *Attorney, Agent, or Firm* — Han IP Corporation

(57) ABSTRACT

Embodiments of silicon-based thermal energy transfer apparatus for gain medium crystal of a laser system are provided. For a disk-shaped crystal, the apparatus includes a silicon-based manifold and a silicon-based cover element. For a rectangular cuboid-shaped gain medium crystal, the apparatus includes a first silicon-based manifold, a second silicon-based manifold, and first and second conduit elements coupled between the first and second manifolds. For a right circular cylinder-shaped gain medium crystal, the apparatus includes a first silicon-based manifold, a second silicon-based manifold, and first and second conduit elements coupled between the first and second manifolds.

5 Claims, 12 Drawing Sheets

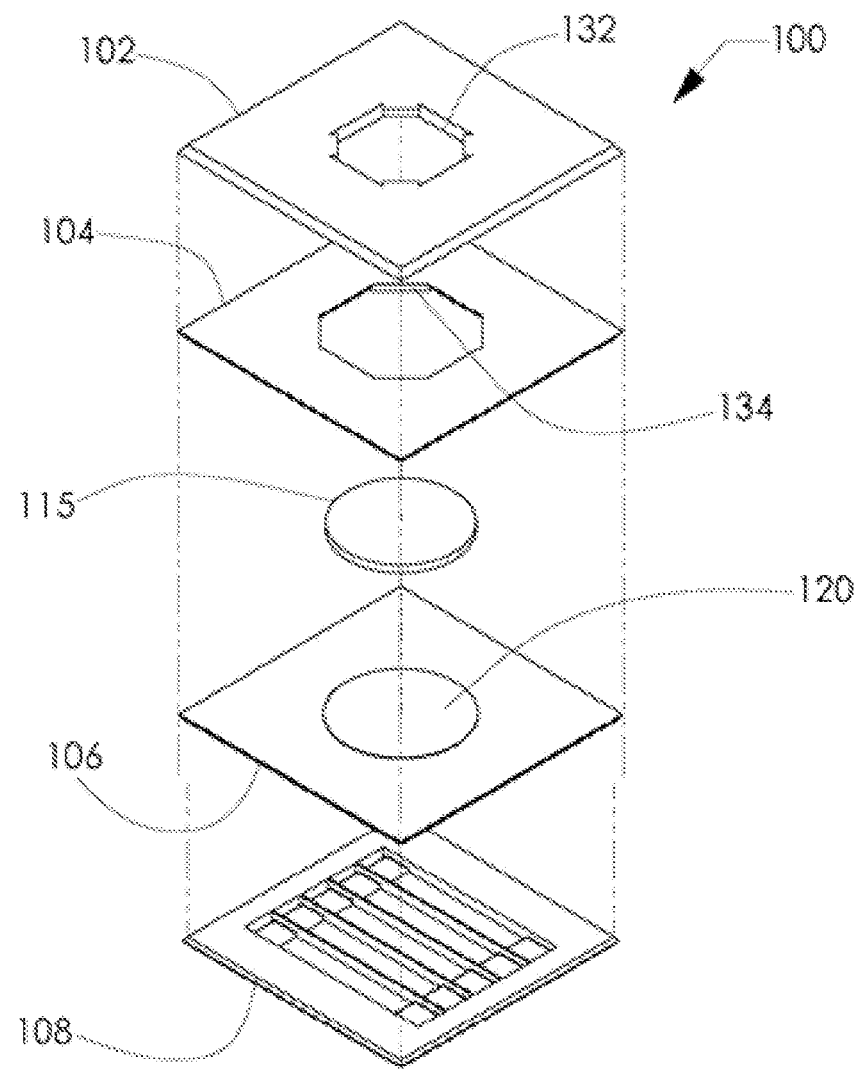
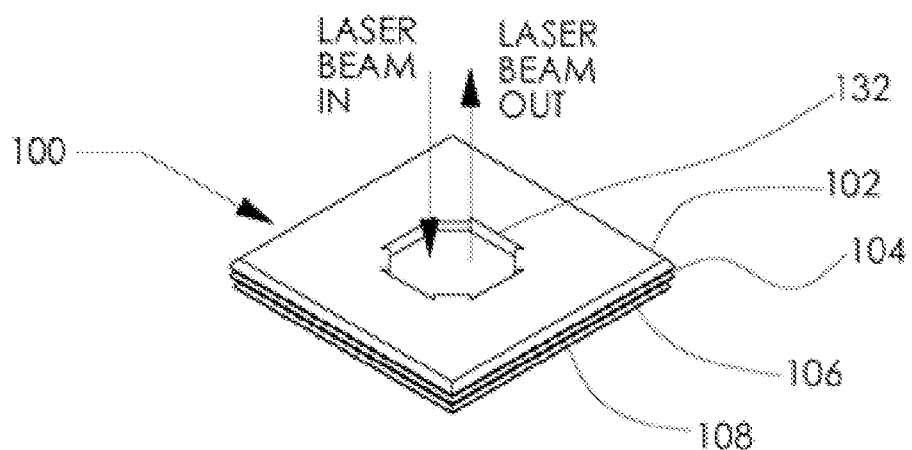
FIG. 1

SILICON-BASED COOLING PACKAGE FOR LASER GAIN MEDIUM

CROSS REFERENCE TO RELATED PATENT APPLICATIONS

This patent application claims priority from U.S. Patent Application No. 61/409,211, filed in the United States Patent & Trademark Office on Nov. 2, 2010, entitled "Silicon-Based Cooling Package for Laser Gain Medium", which is hereby incorporated in its entirety by reference.

BACKGROUND

1. Technical Field

The present disclosure generally relates to the field of transfer of thermal energy and, more particularly, to removal of thermal energy from a gain medium of a laser system.

2. Description of the Related Art

In general, a laser system is constructed with three main parts including an energy source, a laser medium, and two or more mirrors that form an optical resonator. The energy source of a laser system is also known as the pump source, and is the part that provides energy to the laser system.

The laser medium of a laser system is also known as the gain medium, and is the major determining factor of various properties of the laser system including the wavelength of operation. The gain medium is excited by the pump source to produce a population inversion. The gain medium is also where spontaneous emission of photons and stimulated emission of photons take place that lead to the phenomenon of optical gain, or amplification. Gain media are generally made of liquids, gases, solids, or semiconductors. The solids used as gain media typically include crystals and glasses, and may be doped with an impurity such as chromium, neodymium, erbium, or titanium ions. As the gain medium is excited to emit photons, a large amount of thermal energy is generated by the gain medium. Such thermal energy needs to be removed from the gain medium, by a cooling package for example, in order to prolong the lifetime of the gain medium as well as keep the laser system within normal operating parameters.

The optical resonator consists of two or more mirrors placed around the gain medium to provide feedback of the light. Light from spontaneous emission of the gain medium is reflected by the mirrors back into the gain medium, where the light may be amplified by stimulated emission. The light may be reflected from the mirrors and thus pass through the gain medium hundreds of times before exiting the gain medium. The design and alignment of the mirrors with respect to the gain medium is crucial to determining the exact operating wavelength and other properties of the laser system.

In applications where the laser system needs to be compact, one or more laser diodes may be used as the energy source given the small form factor of laser diodes. The gain media in such a laser system correspondingly tends to have small form factor as well. However, conventional metal-based cooling package made of copper, aluminum or a type of metal alloy tend to suffer from corrosion and clogging of coolant channel, if liquid is used as a heat transfer medium. Additionally, at very high temperature the metal may deform if the temperature approaches the melting temperature of the metal.

SUMMARY

In one aspect, a thermal energy transfer apparatus that removes thermal energy from a disk-shaped gain medium crystal of a laser system includes a silicon-based manifold and a silicon-based cover element.

The silicon-based manifold has internal coolant flow channels, a first side having coolant inlet ports and coolant outlet ports that are connected to the internal coolant flow channels, and a second side opposite the first side and being substantially flat to provide surface area to contact with a first primary surface of the crystal. The silicon-based cover element has an opening to expose a portion of a second primary surface of the crystal that is opposite the first primary surface of the crystal when the crystal is mounted between the cover element and the manifold.

The manifold may include a first half structure made of silicon and a second half structure made of silicon. The first half structure may have a first primary surface that is the first side of the manifold and a second primary surface opposite the first primary surface. The first half structure may have openings as the coolant inlet ports and the coolant outlet ports of the manifold. The second primary surface of the first half structure may have grooves that form a first half of the internal coolant flow channels of the manifold. The second half structure may have a first primary surface that is the second side of the first manifold and a second primary surface opposite the first primary surface. The second primary surface of the second half structure may have grooves that form a second half of the internal coolant flow channels of the manifold.

The cover element may include a first plate made of silicon and a second plate made of silicon. The first plate may have an opening smaller than an area of the second primary surface of the crystal to expose a portion of the second primary surface of the crystal. The second plate may have an opening larger than the area of the second primary surface of the crystal and shaped to at least partially circumscribe the crystal with the crystal contacting a plurality of points of the opening of the second plate when the crystal is mounted between the cover element and the manifold.

The apparatus may further include a layer of synthetic diamond on the second side of the manifold to be in direct contact with the crystal. Alternatively, the apparatus may further include a plurality of nanotubes on the second side of the manifold to be in direct contact with the crystal.

The apparatus may further include an inbound coolant tubing made of non-corrosive material, an outbound coolant tubing made of non-corrosive material, an adapter made of non-corrosive material, and a heat exchanger system. The adapter may have a first side coupled to the first side of the manifold and a second side coupled to the inbound coolant tubing and the outbound coolant tubing. The adapter may have an inbound coolant flow channel to allow the coolant to flow from the inbound coolant tubing to the manifold through the adapter, and an outbound coolant flow channel to allow the coolant to flow from the manifold to the outbound coolant tubing through the adapter. The heat exchanger system may be coupled to the outbound coolant tubing and the inbound coolant tubing to supply the coolant to the inbound coolant tubing and receive the coolant from the outbound coolant tubing to remove thermal energy from the coolant.

In another aspect, a thermal energy transfer apparatus that removes thermal energy from a rectangular cuboid-shaped gain medium crystal of a laser system includes a first silicon-based manifold, a second silicon-based manifold, a first conduit element, and a second conduit element.

The first silicon-based manifold has internal coolant flow channels, a first side having coolant outlet ports that are connected to the internal coolant flow channels, and a second side opposite the first side and having coolant inlet ports that are connected to the internal coolant flow channels. The second side of the first manifold is substantially flat to provide surface area to contact with a first surface of the crystal. The second silicon-based manifold has internal coolant flow channels, a first side having coolant inlet ports that are connected to the internal coolant flow channels, and a second side opposite the first side and having coolant outlet ports that are connected to the internal coolant flow channels. The second side of the second manifold is substantially flat to provide surface area to contact with a second surface of the crystal. The first conduit element is coupled between the first and second manifolds and has a cavity that allows a portion of a coolant to flow through the first conduit element from a first group of the coolant outlet ports of the second manifold to a first group of the coolant inlet ports of the first manifold. A first side of the first conduit element is substantially flat to provide surface area to contact with a third surface of the crystal. The second conduit element is coupled between the first and second manifolds and has a cavity that allows a portion of a coolant to flow through the first conduit element from a first group of the coolant outlet ports of the second manifold to a first group of the coolant inlet ports of the first manifold. A first side of the first conduit element is substantially flat to provide surface area to contact with a fourth surface of the crystal.

The first manifold may include a first half structure made of silicon and a second half structure made of silicon. The first half structure may have a first primary surface that is the first side of the first manifold and a second primary surface opposite the first primary surface. The first half structure may have openings as the coolant outlet ports of the first manifold. The second primary surface of the first half structure may have grooves that form a first half of the internal coolant flow channels of the first manifold. The second half structure may have a first primary surface that is the second side of the first manifold and a second primary surface opposite the first primary surface. The second half structure may have openings as the coolant inlet ports of the first manifold. The second primary surface of the second half structure may have grooves that form a second half of the internal coolant flow channels of the first manifold.

The second manifold may have a third half structure made of silicon and a fourth half structure made of silicon. The third half structure may have a first primary surface that is the first side of the second manifold and a second primary surface opposite the first primary surface. The third half structure may have openings as the coolant inlet ports of the second manifold. The second primary surface of the third half structure may have grooves that form a first half of the internal coolant flow channels of the second manifold. The fourth half structure may have a first primary surface that is the second side of the second manifold and a second primary surface opposite the first primary surface. The fourth half structure may have openings as the coolant outlet ports of the second manifold. The second primary surface of the fourth half structure may have grooves that form a second half of the internal coolant flow channels of the second manifold.

At least one of the first conduit element or the second conduit element may be made of silicon, a metal-based or ceramic material.

The apparatus may further include a layer of synthetic diamond on the second side of the first manifold to be in direct contact with the crystal, and a layer of synthetic diamond on the second side of the second manifold to be in direct contact with the crystal.

Alternatively, the apparatus may further include a plurality of nanotubes on the second side of the first manifold to be in direct contact with the crystal, and a plurality of nanotubes on the second side of the second manifold to be in direct contact with the crystal.

The apparatus may further include an outbound coolant tubing made of non-corrosive material, an inbound coolant tubing made of non-corrosive material, a first adapter made of non-corrosive material, and a second adapter made of non-corrosive material. The first adapter may have a first side coupled to the first side of the first manifold and a second side coupled to the outbound coolant tubing. The first adapter may have an internal coolant flow channel to allow the coolant to flow from the first manifold to the outbound coolant tubing through the first adapter. The second adapter may have a first side coupled to the first side of the second manifold and a second side coupled to the inbound coolant tubing. The second adapter may have an internal coolant flow channel to allow the coolant to flow from the inbound coolant tubing to the second manifold through the second adapter.

The apparatus may include a heat exchanger system coupled to the outbound coolant tubing and the inbound coolant tubing such that the heat exchanger system supplies the coolant to the inbound coolant tubing and receives the coolant from the outbound coolant tubing to remove thermal energy from the coolant.

Alternatively, the apparatus may include a coolant supplier coupled to the inbound coolant tubing to supply the coolant at a first temperature range, and a coolant receiver coupled to the outbound coolant tubing to receive the coolant at a second temperature range that is higher than the temperature range.

In yet another aspect, a thermal energy transfer apparatus that removes thermal energy from a right circular cylinder-shaped gain medium crystal of a laser system includes a first silicon-based manifold, a second silicon-based manifold, a first conduit element, and a second conduit element.

The first silicon-based manifold has internal coolant flow channels, a first side having coolant outlet ports that are connected to the internal coolant flow channels, and a second side opposite the first side and having coolant inlet ports that are connected to the internal coolant flow channels. The second side of the first manifold has a groove to accommodate a portion of the crystal. The second silicon-based manifold has internal coolant flow channels, a first side having coolant inlet ports that are connected to the internal coolant flow channels, and a second side opposite the first side and having coolant outlet ports that are connected to the internal coolant flow channels. The second side of the second manifold has a groove to accommodate a portion of the crystal. The first conduit element is coupled between the first and second manifolds and has a cavity that allows a portion of a coolant to flow through the first conduit element from a first group of the coolant outlet ports of the second manifold to a first group of the coolant inlet ports of the first manifold. A first side of the first conduit element is shaped to accommodate a portion of the crystal. The second conduit element is coupled between the first and second manifolds and has a cavity that allows a portion of a coolant to flow through the first conduit element from a first group of the coolant outlet ports of the second manifold to a first group of the coolant inlet ports of the first manifold. A first side of the second conduit element being shaped to accommodate a portion of the crystal.

The first manifold may include a first half structure made of silicon and a second half structure made of silicon. The first half structure may have a first primary surface that is the first side of the first manifold and a second primary surface opposite the first primary surface. The first half structure may have openings as the coolant outlet ports of the first manifold. The second primary surface of the first half structure may have grooves that form a first half of the internal coolant flow channels of the first manifold. The second half structure may have a first primary surface that is the second side of the first manifold and a second primary surface opposite the first primary surface. The second half structure may have openings as the coolant inlet ports of the first manifold. The second primary surface of the second half structure may have grooves that form a second half of the internal coolant flow channels of the first manifold.

The second manifold may include a third half structure made of silicon and a fourth half structure made of silicon. The third half structure may have a first primary surface that is the first side of the second manifold and a second primary surface opposite the first primary surface. The third half structure may have openings as the coolant inlet ports of the second manifold. The second primary surface of the third half structure may have grooves that form a first half of the internal coolant flow channels of the second manifold. The fourth half structure may have a first primary surface that is the second side of the second manifold and a second primary surface opposite the first primary surface. The fourth half structure may have openings as the coolant outlet ports of the second manifold. The second primary surface of the fourth half structure may have grooves that form a second half of the internal coolant flow channels of the second manifold.

At least one of the first conduit element or the second conduit element is made of silicon, a metal-based or ceramic material.

The apparatus may further include a filler material such as a soft-metal, silver glass or thermal epoxy, to fill a gap of space between the crystal, the first manifold, the second manifold, the first conduit element, and the second conduit element.

The apparatus may further include an outbound coolant tubing made of non-corrosive material, an inbound coolant tubing made of non-corrosive material, a first adapter made of non-corrosive material, and a second adapter made of non-corrosive material. The first adapter may have a first side coupled to the first side of the first manifold and a second side coupled to the outbound coolant tubing. The first adapter may have a coolant flow channel to allow the coolant to flow from the first manifold to the outbound coolant tubing through the first adapter. The second adapter may have a first side coupled to the first side of the second manifold and a second side coupled to the inbound coolant tubing. The second adapter may have a coolant flow channel to allow the coolant to flow from the inbound coolant tubing to the second manifold through the second adapter.

The apparatus may include a heat exchanger system coupled to the outbound coolant tubing and the inbound coolant tubing such that the heat exchanger system supplies the coolant to the inbound coolant tubing and receives the coolant from the outbound coolant tubing to remove thermal energy from the coolant.

Alternatively, the apparatus may include a coolant supplier coupled to the inbound coolant tubing to supply the coolant at a first temperature range, and a coolant receiver coupled to the outbound coolant tubing to receive the coolant at a second temperature range that is higher than the temperature range.

This summary is provided to introduce concepts relating to heat removal from laser gain medium using silicon-based thermal energy transfer package. These techniques are further described below in the detailed description. This summary is not intended to identify essential features of the claimed subject matter, nor is it intended for use in determining the scope of the claimed subject matter.

BRIEF DESCRIPTION OF THE DRAWINGS

The accompanying drawings are included to provide a further understanding of the disclosure, and are incorporated in and constitute a part of the present disclosure. The drawings illustrate embodiments of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 1 illustrates a first silicon-based thermal energy transfer device for a disk-shaped gain medium crystal of a laser system in accordance with one non-limiting embodiment.

DETAILED DESCRIPTION OF PREFERRED EMBODIMENTS

Overview

The present disclosure describes embodiments of silicon-based thermal energy transfer techniques for the gain medium crystal of a laser system.

While aspects of described techniques relating to silicon-based thermal energy transfer packages for laser gain media can be implemented in any number of different laser systems, embodiments are described in context of the following exemplary configurations.

Illustrative First Thermal Energy Transfer Apparatus

Figure 2:
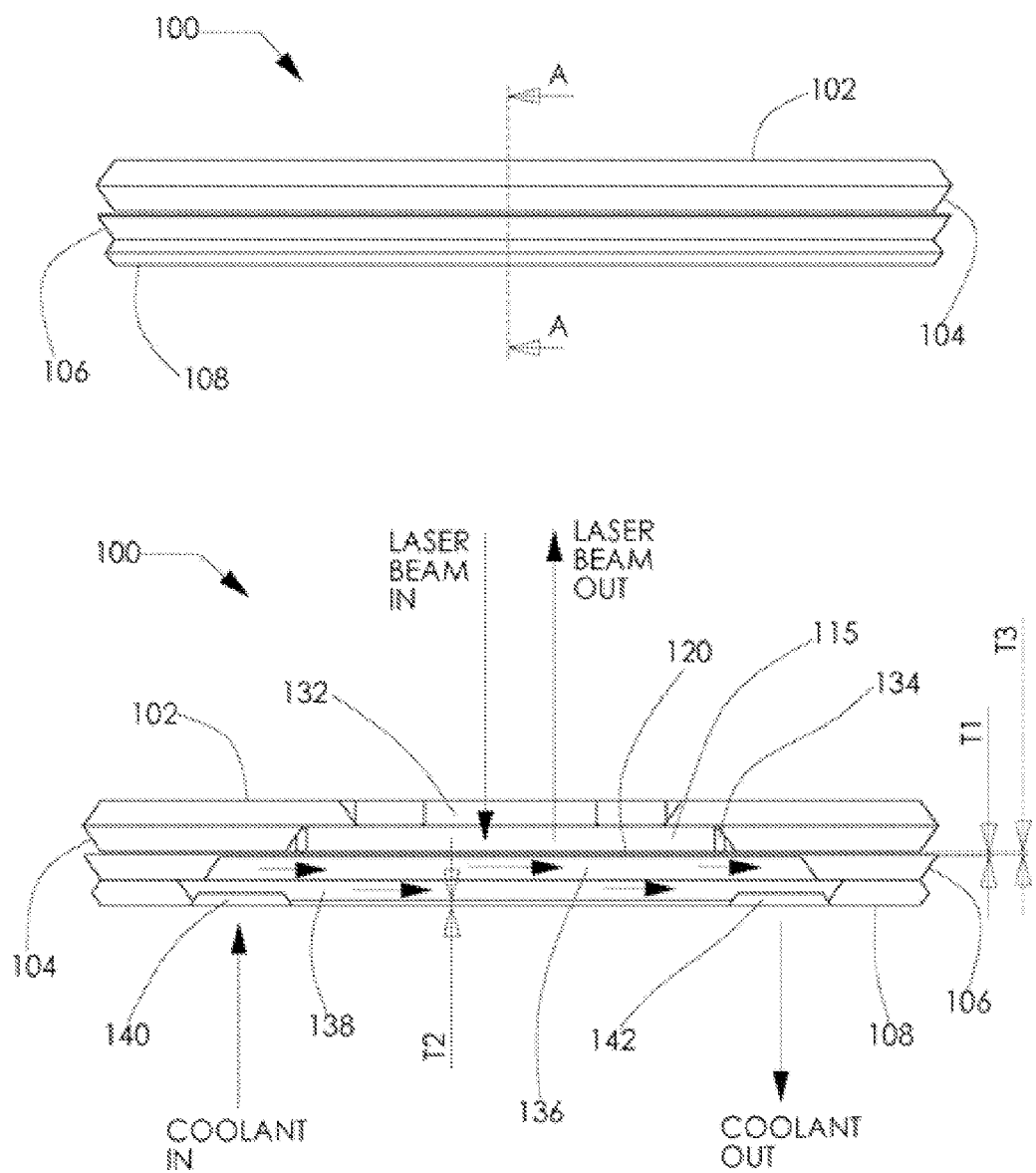
FIG. 2 illustrates a side view and a cross-sectional view of the silicon-based thermal energy transfer device of FIG. 1.
Figure 3:
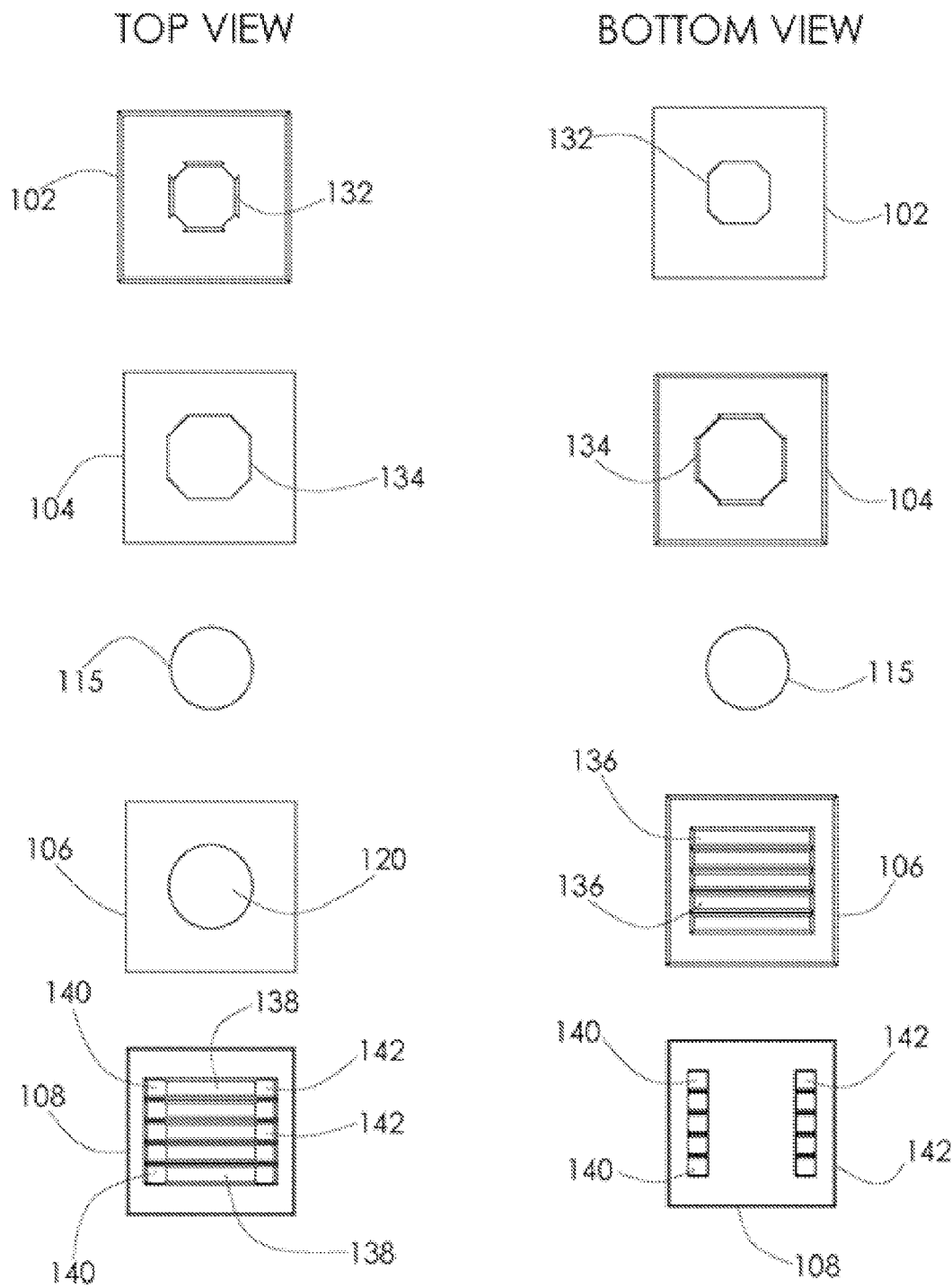
FIG. 3 illustrates a top view and a bottom view of the silicon-based thermal energy transfer device of FIG. 1.

FIGS. 1-3 illustrate various views of a silicon-based thermal energy transfer device 100 for a disk-shaped gain medium crystal 115 of a laser system in accordance with one non-limiting embodiment. The device 100 includes a first plate 102, a second plate 104, a first half structure 108, and a second half structure 106. Each of the first plate 102, second plate 104, first half structure 108, and second half structure 106 is made of silicon. In one embodiment, each of the first plate 102, second plate 104, first half structure 108, and second half structure 106 is deposited with a combination of layer of metals such as, for example, Cr/Au, TiW/Ni/Au or TiW/Au. In one embodiment, each of the first plate 102, second plate 104, first half structure 108, and second half structure 106 is fabricated from a respective silicon wafer using semiconductor fabrication technology including photolithography, dry etch, wet etch, etc.

The first plate 102 has an opening 132. The opening 132 has an area that is smaller than the area of either of the two primary surfaces of the crystal 115. In one embodiment, the opening 132 is approximately octagon-shaped as shown in FIG. 1. In other embodiments, the opening 132 may have one of other shapes such as a circular shape or another polygonal shape.

The second plate 104 has an opening 134. The opening 134 has an area that is slightly larger than the area of either of the two primary surfaces of the crystal 115. The opening 134 is shaped so that, when the crystal 115 is placed within the opening 134, the opening 134 at least partially circumscribes the crystal 115 with the crystal 115 contacting a plurality of points of the opening 134. In one embodiment, the opening 134 is approximately octagon-shaped as shown in FIG. 1. In other embodiment, the opening 134 may have one of other polygonal shapes.

The first half structure 108 has a first row of openings 140 as coolant inlet ports and a second row of openings 142 as coolant outlet ports. As shown in FIG. 3, on one of the two primary surfaces of the first half structure 108, there are grooves 138 each of which connecting a respective pair of one of the openings 140 and one of the openings 142.

The second half structure 106 also has a plurality of grooves 136 on one of its two primary surfaces. Each of the grooves 136 corresponds to a respective one of the grooves 138 such that when the first half structure 108 and the second half structure 106 are bonded together to form a manifold, the grooves 136 and the grooves 138 form internal coolant flow channels for a coolant flowing in through the openings 140 to flow out through the openings 142. The primary surface of the second half structure 106 opposite the primary surface that has the grooves 136 is substantially flat to provide surface area to contact with the corresponding primary surface of the crystal 115.

In one embodiment, the thinnest part of the second half structure 106 where the grooves 136 are, denoted as thickness T1 in FIG. 2, is approximately a range of 50 μm to 100 um. In one embodiment, the thinnest part of the first half structure 108 where the grooves 138 are, denoted as thickness T2 in FIG. 2, is approximately a range of 100 μm to 200 um.

As shown in FIGS. 1 and 2, the first plate 102 and the second plate 104 together form a cover element. The first half structure 108 and the second half structure 106 together form a manifold. The first plate 102 and the second plate 104 may be affixed to each other by solder or silicon-to-silicon bonding. The first half structure 108 and the second half structure 106 may be affixed to each other by solder or silicon-to-silicon bonding. In one embodiment, the cover element formed by the first plate 102 and the second plate 104 and the manifold formed by the first half structure 108 and the second half structure 106 are soldered together. That is, the primary surface of the second plate 104 facing the second half structure 106 is soldered to the primary surface of the second half structure 106 facing the second plate 104.

In various embodiments, a layer of thermally-conductive material 120 is coated on at least the side of the manifold formed by the first half structure 108 and the second half structure 106 that faces the cover element formed by the first plate 102 and the second plate 104. In one embodiment, the layer of thermally-conductive material 120 has a thickness, denoted as thickness T3 in FIG. 2, of approximately a range of 25 to 300 μm. When the crystal 115 is mounted between the cover element formed by the first plate 102 and the second plate 104 and the manifold formed by the first half structure 108 and the second half structure 106, the primary surface of the crystal 115 that is not exposed is in direct contact with the layer of thermally-conductive material 120. The layer of thermally-conductive material 120 needs to have good conductive thermal efficiency to maximize thermal energy in the crystal 115 to be transferred to the second half structure 106. The layer of thermally-conductive material 120 also relieves the thermal stress between the crystal 115 and the second half structure 106 when there is a temperature differential between the crystal 115 and the second half structure 106. In one embodiment, the layer of thermally-conductive material 120 is a layer of synthetic diamond. The layer of synthetic diamond may be of black color (with thermal conductivity of 800 to 1200 W-deg/m) or, alternatively, translucent color (with thermal conductivity of 1200 to 2000 W-deg/m). In another embodiment, the layer of thermally-conductive material 120 includes a plurality of nanotubes.

As shown in FIGS. 1 and 2, when the disk-shaped crystal 115 is mounted between the cover element formed by the first plate 102 and the second plate 104 and the manifold formed by the first half structure 108 and the second half structure 106, a portion but not all of a primary surface of the crystal 115 is exposed. With one primary surface of the crystal 115 exposed to a laser beam and the opposite primary surface of the crystal 115 in direct contact with the layer of thermally-conductive material 120 coated on the second half structure 106, the laser beam is refracted a number of times, and thereby being amplified, within the crystal 115 before a laser beam with increased energy is reflected out of the crystal 115 as shown in FIG. 1.

Figure 10:
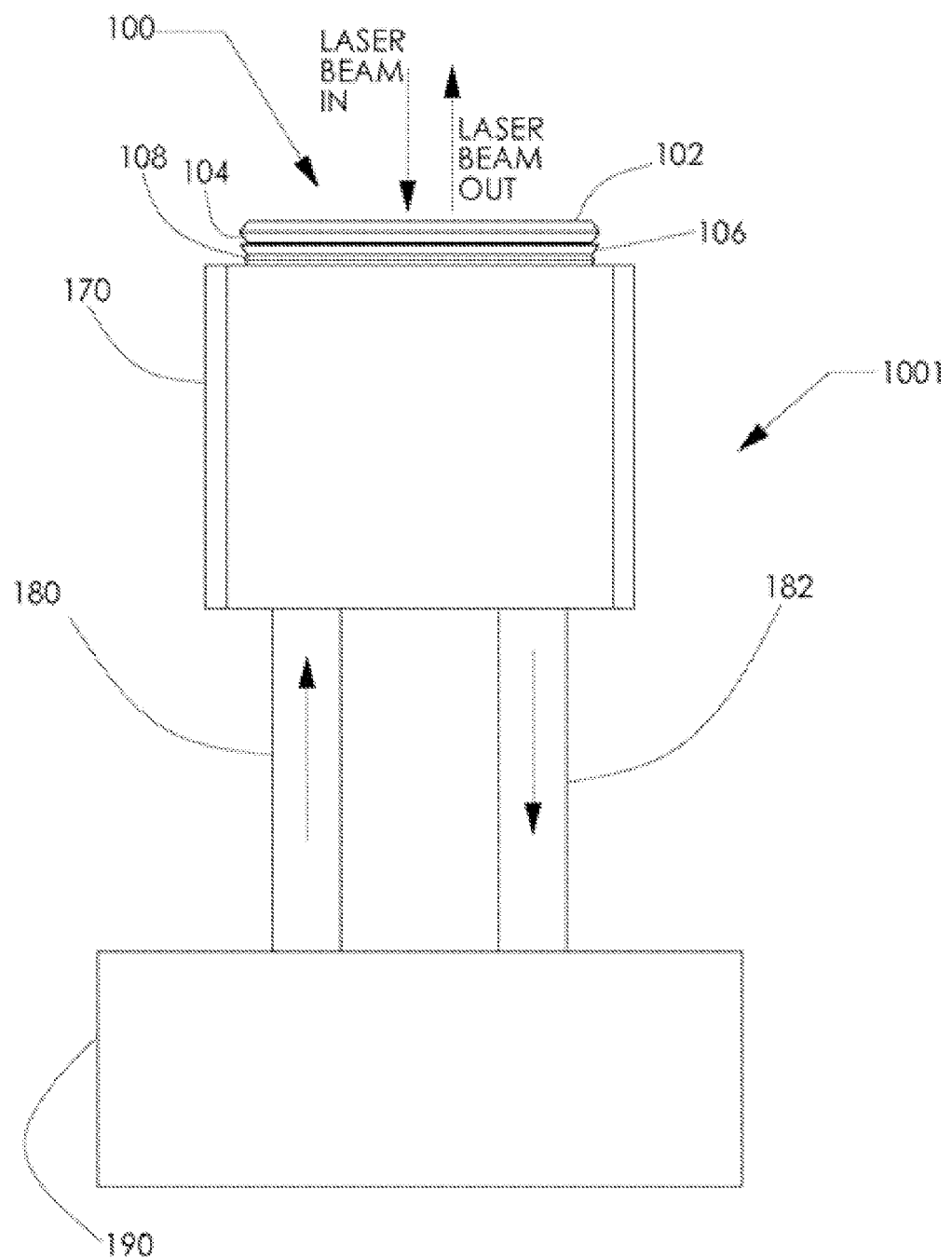
FIG. 10 illustrates a first thermal energy transfer apparatus that includes the silicon-based thermal energy transfer device of FIGS. 1-3 in accordance with one non-limiting embodiment.

FIG. 10 illustrates a thermal energy transfer apparatus 1001 that includes the silicon-based thermal energy transfer device 100 in accordance with one non-limiting embodiment. The apparatus 1001 includes an inbound coolant tubing 180, an outbound coolant tubing 182, an adapter 170, and a heat exchanger system 190.

The adapter 170 has a first side coupled to the first side of the first half structure 108 that has the openings 140 and 142, and a second side coupled to the inbound coolant tubing 180 and the outbound coolant tubing 182. The adapter 170 has an inbound coolant flow channel (not shown) to allow the coolant to flow from the inbound coolant tubing 180 to the manifold formed by the half structures 106 and 108 through the adapter 170. The adapter also has an outbound coolant flow channel (not shown) to allow the coolant to flow from the manifold formed by the half structures 106 and 108 to the outbound coolant tubing 182 through the adapter 170.

The heat exchanger system 190 is coupled to the outbound coolant tubing 182 and the inbound coolant tubing 180. The heat exchanger system 190 supplies the coolant to the inbound coolant tubing 180 and receives the coolant from the outbound coolant tubing 182 to remove thermal energy from the coolant. In one embodiment, the coolant is de-ionized water. In other embodiments, the coolant may be other suitable fluid such as, for example, distilled water, water-alcohol mixture, or water-glycol mixture.

Each of the inbound coolant tubing 180, outbound coolant tubing 182, and adapter 170 is respectively made of a non-corrosive material. In one embodiment, each of the inbound coolant tubing 180 and outbound coolant tubing 182 is respectively made of stainless steel, a nickel-plated metallic material, a gold-plated metallic material, or a ceramic material. In one embodiment, the adapter 170 is made of a ceramic material. The materials that the inbound coolant tubing 180, outbound coolant tubing 182, and adapter 170 are made of cannot be plastics or any material subject to corrosion when exposed to water. Chemicals leaching out of plastics or particles coming off of a material due to corrosion, when any of the inbound coolant tubing 180, outbound coolant tubing 182, or adapter 170 is made of plastics or a corrosive material, will likely foul or clog up the internal coolant flow channels of the manifold formed by the first half structure 108 and second half structure 106 as well as the heat exchanger system 190.

In one embodiment, the inbound coolant tubing 180 and the outbound coolant tubing 182 are coupled to the adapter 170 by solder, press-fit, epoxy bonding, or single-body machined. In one embodiment, the adapter 170 is coupled to the second half structure 108 by solder or epoxy bonding.

Illustrative Second Thermal Energy Transfer Apparatus

Figure 4:
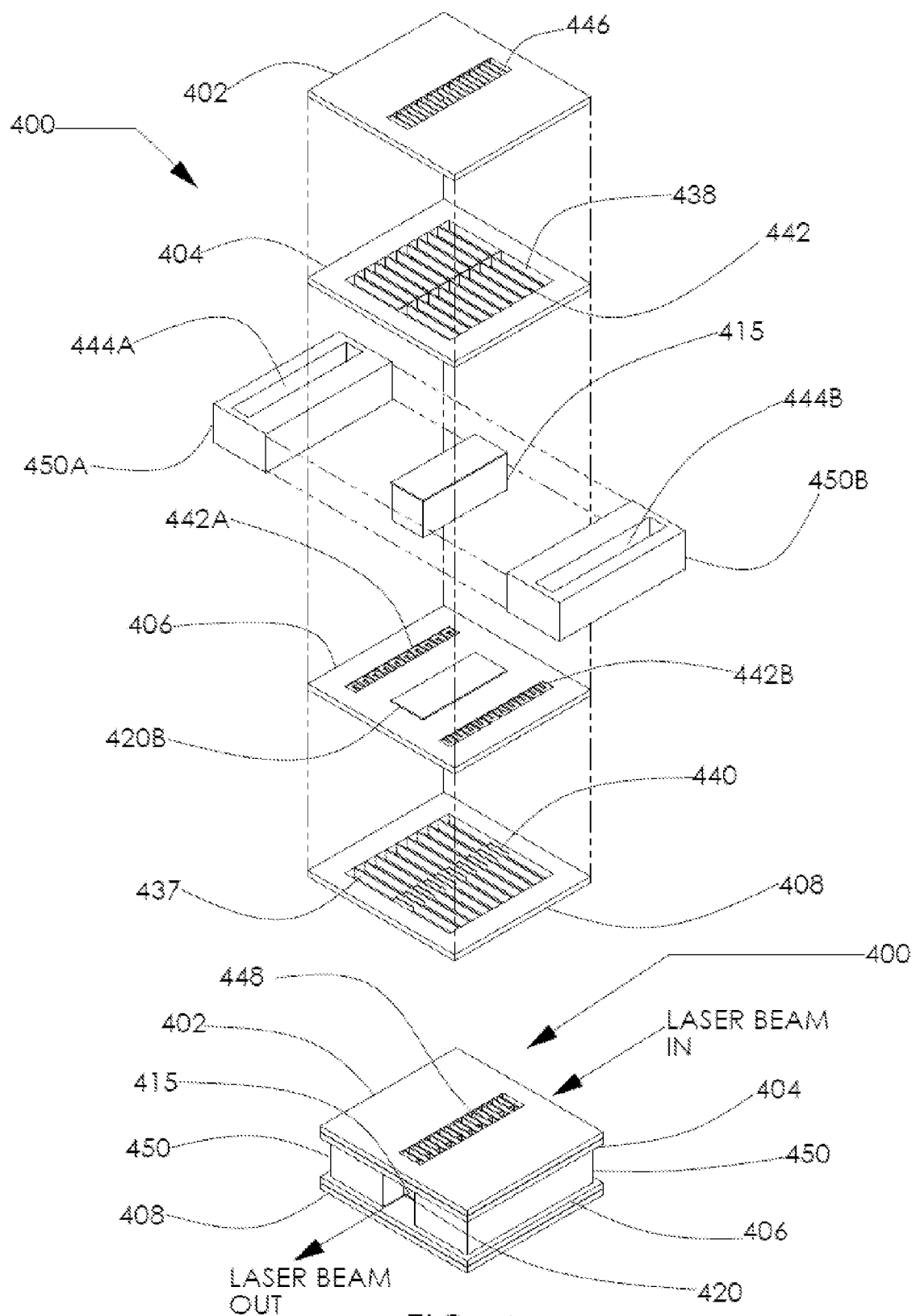
FIG. 4 illustrates a second silicon-based thermal energy transfer device for a rectangular cuboid-shaped gain medium crystal of a laser system in accordance with one non-limiting embodiment.
Figure 5:
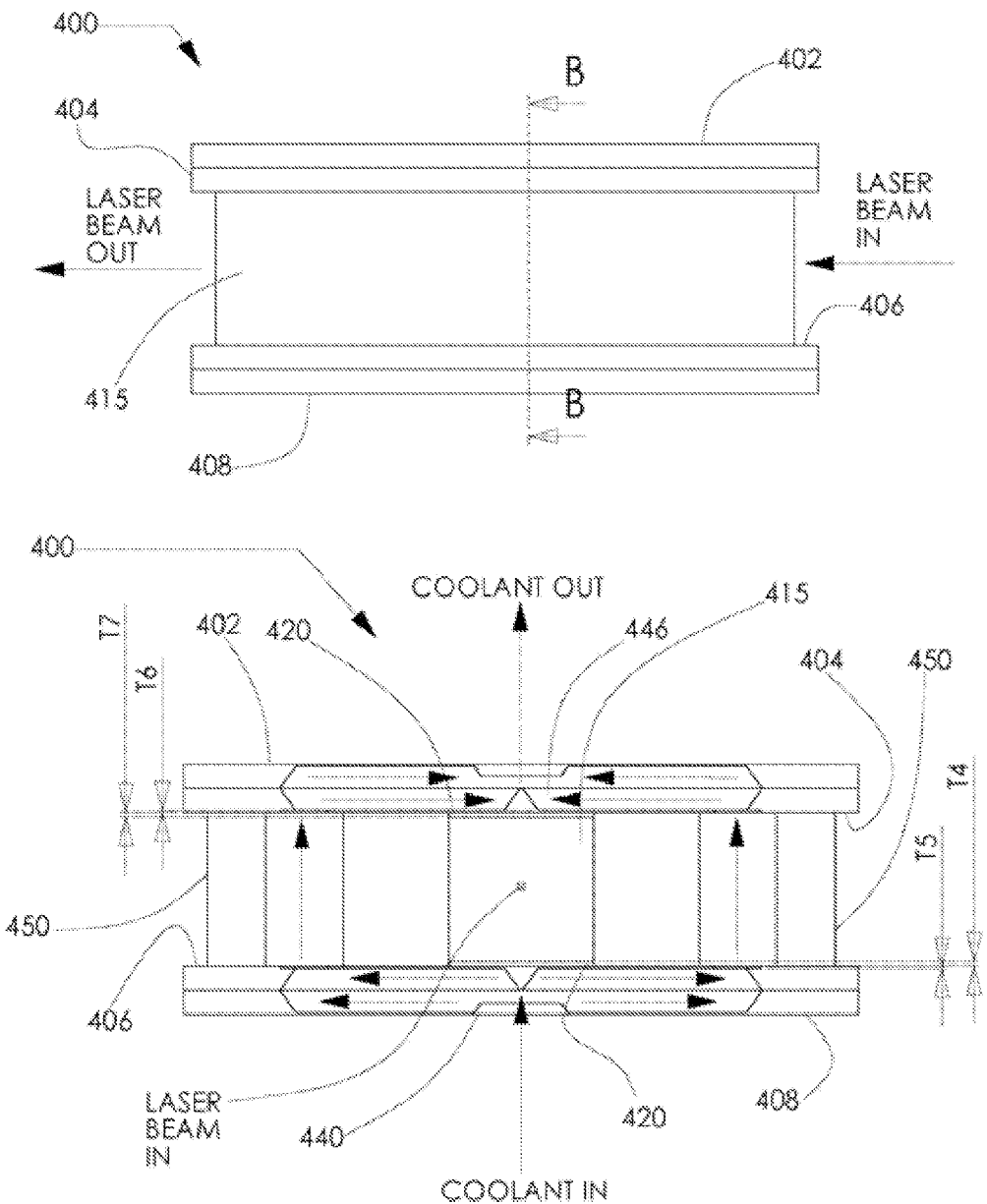
FIG. 5 illustrates a side view and a cross-sectional view of the silicon-based thermal energy transfer device of FIG. 4.
Figure 6:
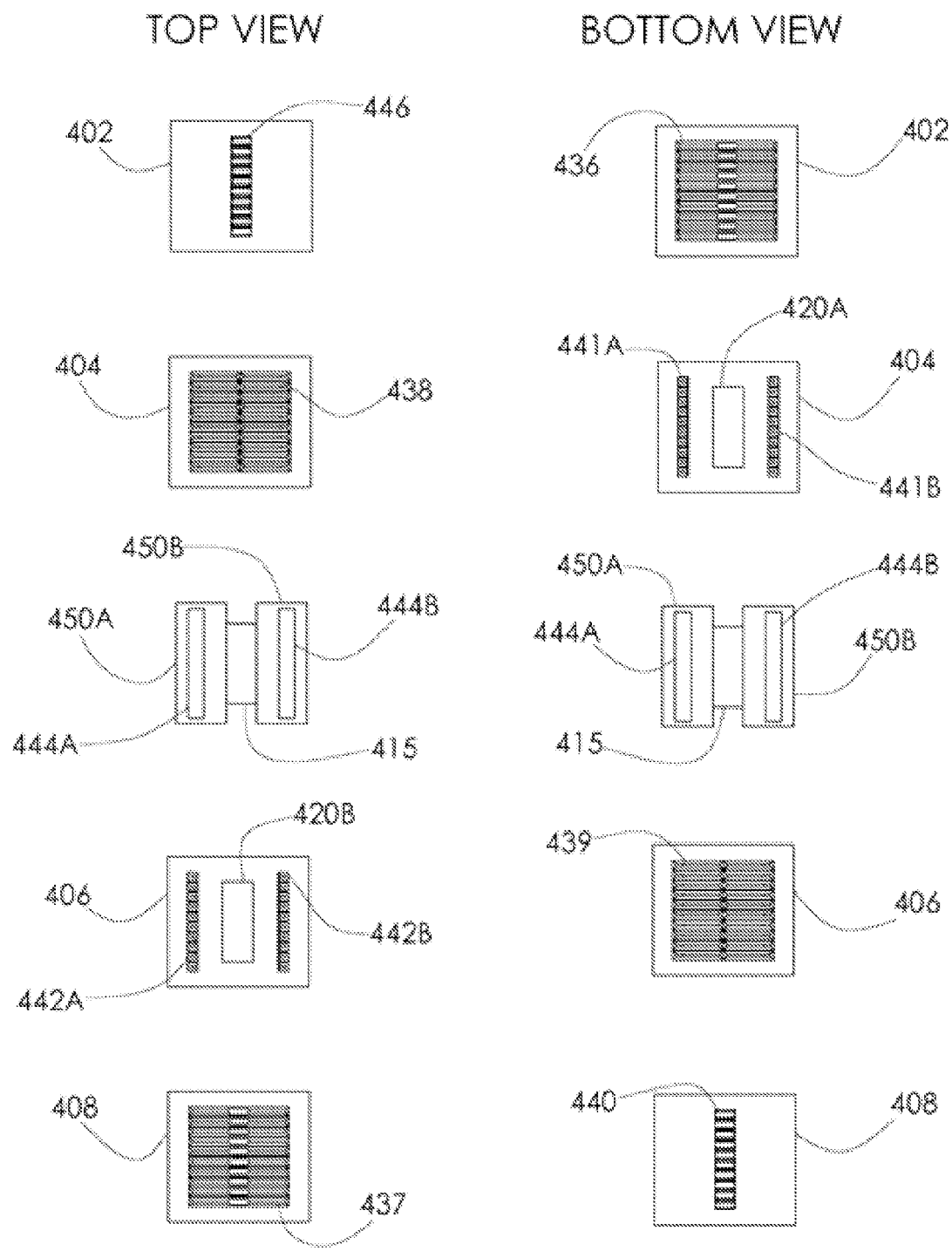
FIG. 6 illustrates a top view and a bottom view of the silicon-based thermal energy transfer device of FIG. 4.

FIGS. 4-6 illustrate various views of a silicon-based thermal energy transfer device 400 for a rectangular cuboid-shaped gain medium crystal 415 of a laser system in accordance with one non-limiting embodiment. The device 400 includes a first half structure 402, a second half structure 404, a third half structure 406, a fourth half structure 408, a first conduit element 450a, and a second conduit element 450b. Each of the first half structure 402, second half structure 404, third half structure 406, and fourth half structure 408 is made of silicon. In one embodiment, each of the first half structure 402, second half structure 404, third half structure 406, and fourth half structure 408 is metal-plated with a metal such as, for example, gold.

In one embodiment, each of the first half structure 402, second half structure 404, third half structure 406, and fourth half structure 408 is fabricated from a respective silicon wafer using semiconductor fabrication technology including photolithography, dry etch, wet etch, etc. In one embodiment, the first half structure 402 and the fourth half structure 408 are identical, and therefore can be made by the same fabrication process and even be from the same silicon wafer. Likewise, in one embodiment, the second half structure 404 and the third half structure 406 are identical, and therefore can be made by the same fabrication process and even be from the same silicon wafer.

The first half structure 402 has a row of openings 446 as coolant outlet ports. As shown in FIG. 6, on one of the two primary surfaces of the first half structure 402, there are grooves 436 each of which associated with a respective one of the openings 446. The second half structure 404 has a first row of openings 441a and a second row of openings 441b as coolant inlet ports. As shown in FIG. 6, on one of the two primary surfaces of the second half structure 404, there are grooves 438 each of which connecting a respective pair of one of the openings 441a and one of the openings 441b. The primary surface of the second half structure 404 opposite the primary surface that has the grooves 438 is substantially flat to provide surface area to contact with the corresponding primary surface of the crystal 415.

In one embodiment, the thinnest part of the second half structure 404 where the grooves 438 are, denoted as thickness T6 in FIG. 5, is approximately a range of 50 to 100 μm.

The fourth half structure 408 has a row of openings 440 as coolant inlet ports. As shown in FIG. 6, on one of the two primary surfaces of the fourth half structure 408, there are grooves 437 each of which associated with a respective one of the openings 440. The third half structure 406 has a first row of openings 442a and a second row of openings 442b as coolant outlet ports. As shown in FIG. 6, on one of the two primary surfaces of the third half structure 406, there are grooves 439 each of which connecting a respective pair of one of the openings 442a and one of the openings 442b. The primary surface of the third half structure 406 opposite the primary surface that has the grooves 439 is substantially flat to provide surface area to contact with the corresponding primary surface of the crystal 415.

In one embodiment, the thinnest part of the third half structure 406 where the grooves 439 are, denoted as thickness T5 in FIG. 5, is approximately a range of 50 to 100 μm.

As shown in FIGS. 4 and 5, the first half structure 402 and the second half structure 404 together form a first manifold. The third half structure 406 and the fourth half structure 408 together form a second manifold. The first half structure 402 and the second half structure 404 may be affixed to each other by solder, silicon-to-gold eutectic bonding, or silicon-to-silicon bonding. The third half structure 406 and the fourth half structure 408 may be affixed to each other by solder, silicon-to-gold eutectic bonding, or silicon-to-silicon bonding.

The first conduit element 450a has a cavity 444a. The second conduit element 450b has a cavity 444b. When the first and second conduit elements 450a and 450b are coupled between the first manifold formed by the first and second half structures 402 and 404 and the second manifold formed by the third and fourth half structures 406 and 408, the cavities 444a and 444b allow a coolant to flow through the first and second conduit elements 450a and 450b from the openings 442a and 442b, which are the coolant outlet ports of the second manifold formed by the third half structure 406 and the fourth half structure 408, to the openings 441a and 441b, which are the coolant inlet ports of the first manifold formed by the first half structure 402 and the second half structure 404. In one embodiment, one or both of the first and second conduit elements 450a and 450b are made of a metal-based material such as, for example, copper, aluminum, or stainless steel. In one embodiment, one or both of the first and second conduit elements 450a and 450b are made of a ceramic or silicon material.

In various embodiments, a layer of thermally-conductive material 420a is coated on at least the side of the first manifold formed by the first and second half structures 402 and 404 that faces the second manifold formed by the third and fourth half structures 406 and 408. In one embodiment, the layer of thermally-conductive material 420a has a thickness, denoted as thickness T7 in FIG. 5, of approximately a range of 100 to 200 μm. When the crystal 415 is mounted between the first manifold formed by the first and second half structures 402 and 404 and the second manifold formed by the third and fourth half structures 406 and 408, one of the primary surfaces of the crystal 415 is in direct contact with the layer of thermally-conductive material 420a.

Similarly, in various embodiments, a layer of thermally-conductive material 420b is coated on at least the side of the second manifold formed by the third and fourth half structures 406 and 408 that faces the first manifold formed by the first and second half structures 402 and 404. In one embodiment, the layer of thermally-conductive material 420b has a thickness, denoted as thickness T4 in FIG. 5, of approximately 100 to 200 μm. When the crystal 415 is mounted between the first manifold formed by the first and second half structures 402 and 404 and the second manifold formed by the third and fourth half structures 406 and 408, one of the primary surfaces of the crystal 415 is in direct contact with the layer of thermally-conductive material 420b.

The layers of thermally-conductive material 420a and 420b need to have good conductive thermal efficiency to maximize thermal energy in the crystal 415 to be transferred to the second half structure 404 and the third half structure 406. The layers of thermally-conductive material 420a and 420b also relieve the thermal stress between the crystal 415 and the second half structure 404 and the third half structure 406 when there is a temperature differential between the crystal 415 and the second half structure 404 and the third half structure 406. In one embodiment, at least one of the layers of thermally-conductive material 420a and 420b is a layer of synthetic diamond. The layer of synthetic diamond may be of black color (with thermal conductivity of 800 to 1200 W-deg/m) or, alternatively, translucent color (with thermal conductivity of 1200 to 2000 W-deg/m). In another embodiment, at least one of the layers of thermally-conductive material 420a and 420b includes a plurality of nanotubes.

As shown in FIGS. 4 and 5, when the rectangular cuboid-shaped crystal 415 is mounted between the first manifold formed by the first and second half structures 402 and 404, the second manifold formed by the third and fourth half structures 406 and 408, and the first and second conduit elements 450a and 450b, four of the six primary surfaces of the crystal 415 are in contact with the device 400, leaving two of the six primary surfaces of the crystal 415 exposed to allow a laser beam to shine through.

Figure 11:
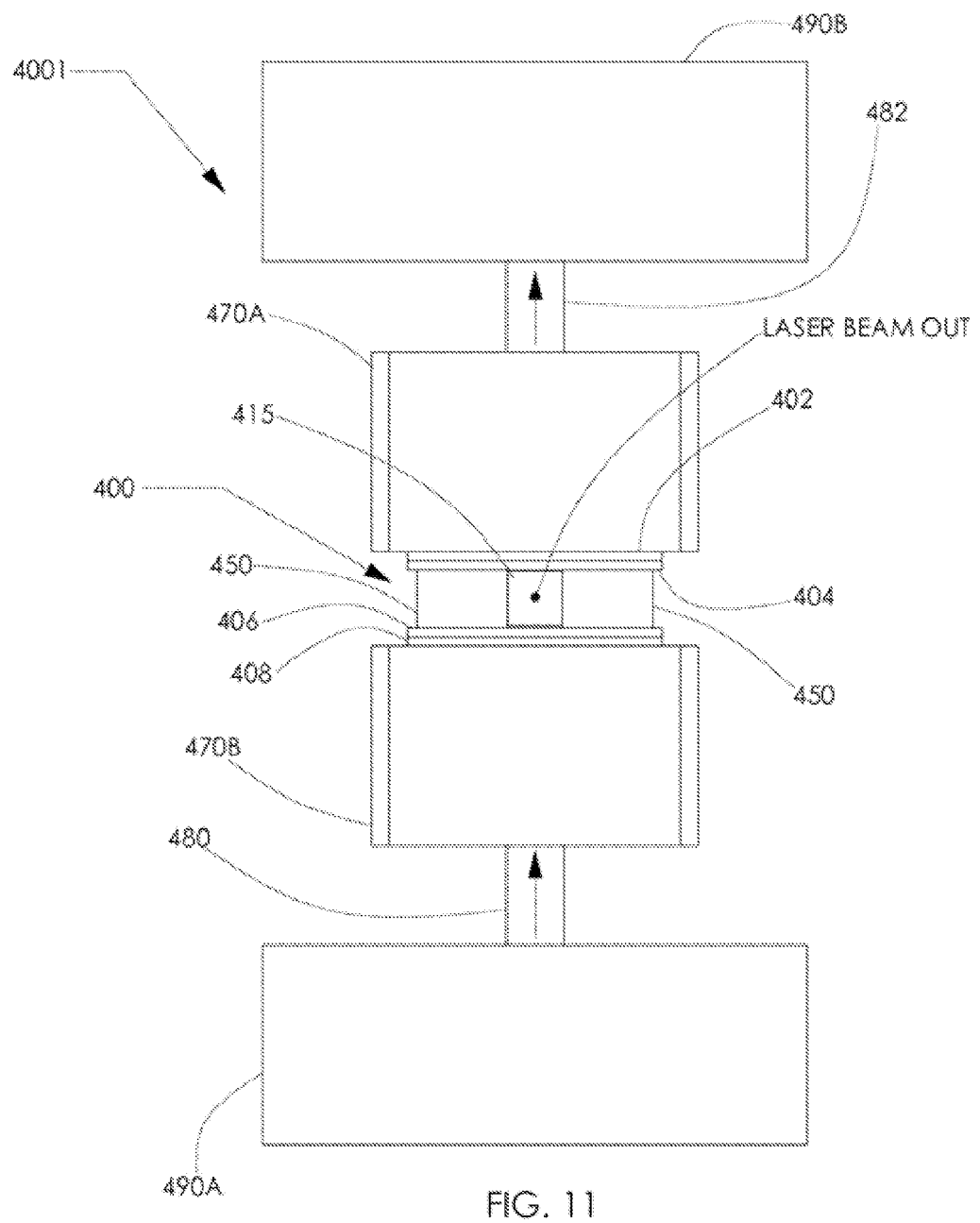
FIG. 11 illustrates a second thermal energy transfer apparatus that includes the silicon-based thermal energy transfer device of FIGS. 4-6 in accordance with one non-limiting embodiment.

FIG. 11 illustrates a thermal energy transfer apparatus 4001 that includes the silicon-based thermal energy transfer device 400 in accordance with one non-limiting embodiment. The apparatus 4001 includes an inbound coolant tubing 480, an outbound coolant tubing 482, a first adapter 470a, and a second adapter 470b.

The first adapter 470a has a first side coupled to the first side of the first manifold, formed by the first and second half structures 402 and 404, and a second side coupled to the outbound coolant tubing 482. The first adapter 470a has an internal coolant flow channel to allow the coolant to flow from the first manifold to the outbound coolant tubing 482 through the first adapter 470a. The second adapter 470b has a first side coupled to the first side of the second manifold, formed by the third and fourth half structures 406 and 408, and a second side coupled to the inbound coolant tubing 480. The second adapter 470b has an internal coolant flow channel to allow the coolant to flow from the inbound coolant tubing 480 to the second manifold through the second adapter 470b.

Each of the inbound coolant tubing 480, outbound coolant tubing 482, first adapter 470a, and second adapter 470b is respectively made of a non-corrosive material. In one embodiment, each of the inbound coolant tubing 480 and outbound coolant tubing 482 is respectively made of stainless steel, a nickel-plated metallic material, a gold-plated metallic material, or a ceramic material. In one embodiment, at least one of the first adapter 470a and second adapter 470b is made of a stainless steel or ceramic material. The materials that the inbound coolant tubing 480, outbound coolant tubing 482, first adapter 470a, and second adapter 470b are made of cannot be plastics or any material subject to corrosion when exposed to water. Chemicals leaching out of plastics or particles coming off of a material due to corrosion, when any of the inbound coolant tubing 480, outbound coolant tubing 482, first adapter 470a, or second adapter 470b is made of plastics or a corrosive material, will likely foul or clog up the internal coolant flow channels of the first manifold formed by the first and second half structure 402 and 404 as well as the internal coolant flow channels of the second manifold formed by the third and fourth half structures 406 and 408.

In one embodiment, the inbound coolant tubing 480 and the outbound coolant tubing 482 are respectively coupled to the second adapter 470b and the first adapter 470a by solder, press-fit, epoxy bonding, or single-body machined. In one embodiment, the first and second adapters 470a and 470b are coupled to the device 400 by solder or epoxy bonding.

In one embodiment, the apparatus 4001 includes a coolant supplier 490a coupled to the inbound coolant tubing 480 to supply the coolant at a first temperature range, and a coolant receiver 490b coupled to the outbound coolant tubing 482 to receive the coolant at a second temperature range that is higher than the temperature range. In an alternative embodiment, the coolant supplier 490a and the coolant receiver 490b are part of a single heat exchanger system.

Illustrative Third Thermal Energy Transfer Apparatus

Figure 7:
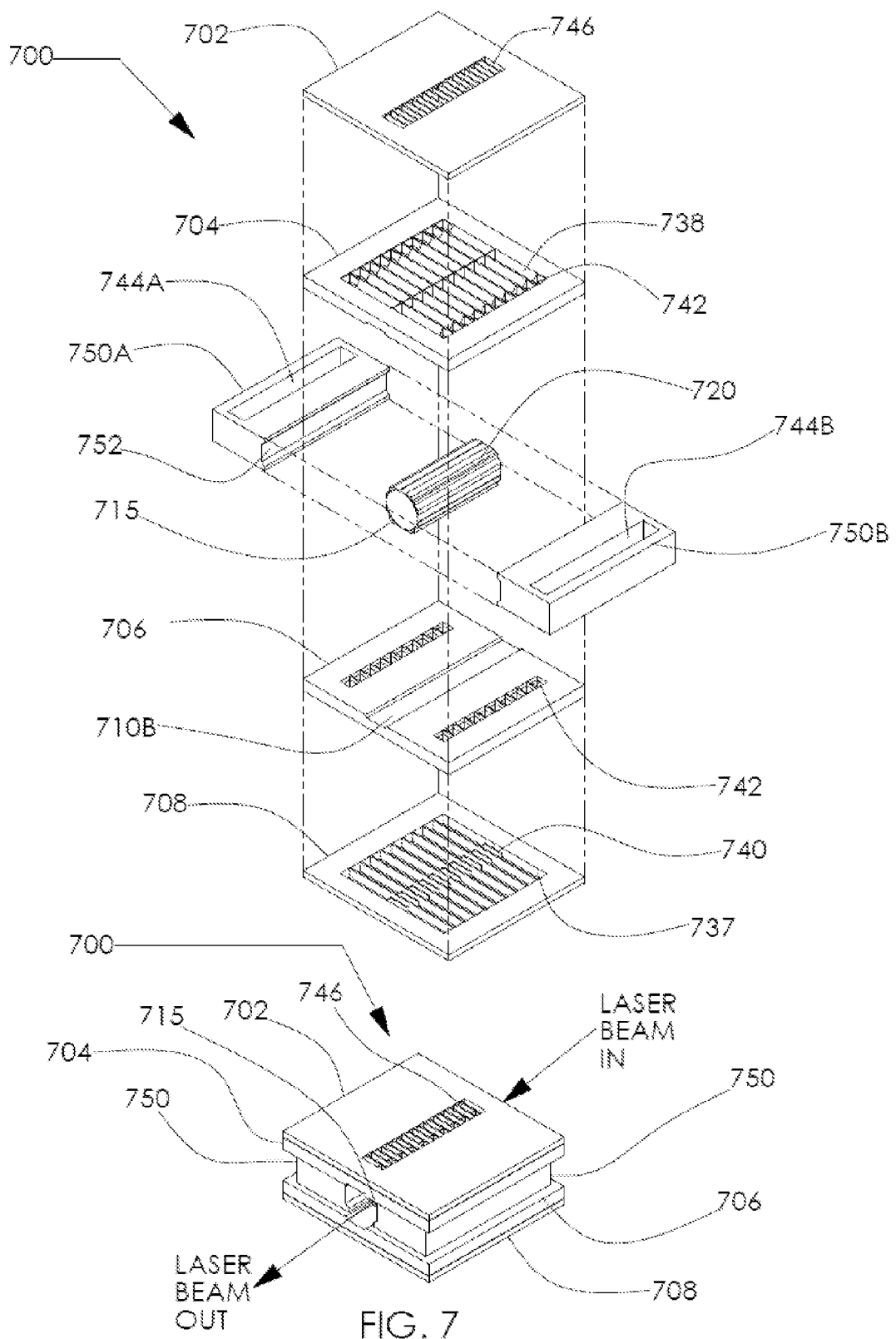
FIG. 7 illustrates a third silicon-based thermal energy transfer device for a right circular cylinder-shaped gain medium crystal of a laser system in accordance with one non-limiting embodiment.
Figure 8:
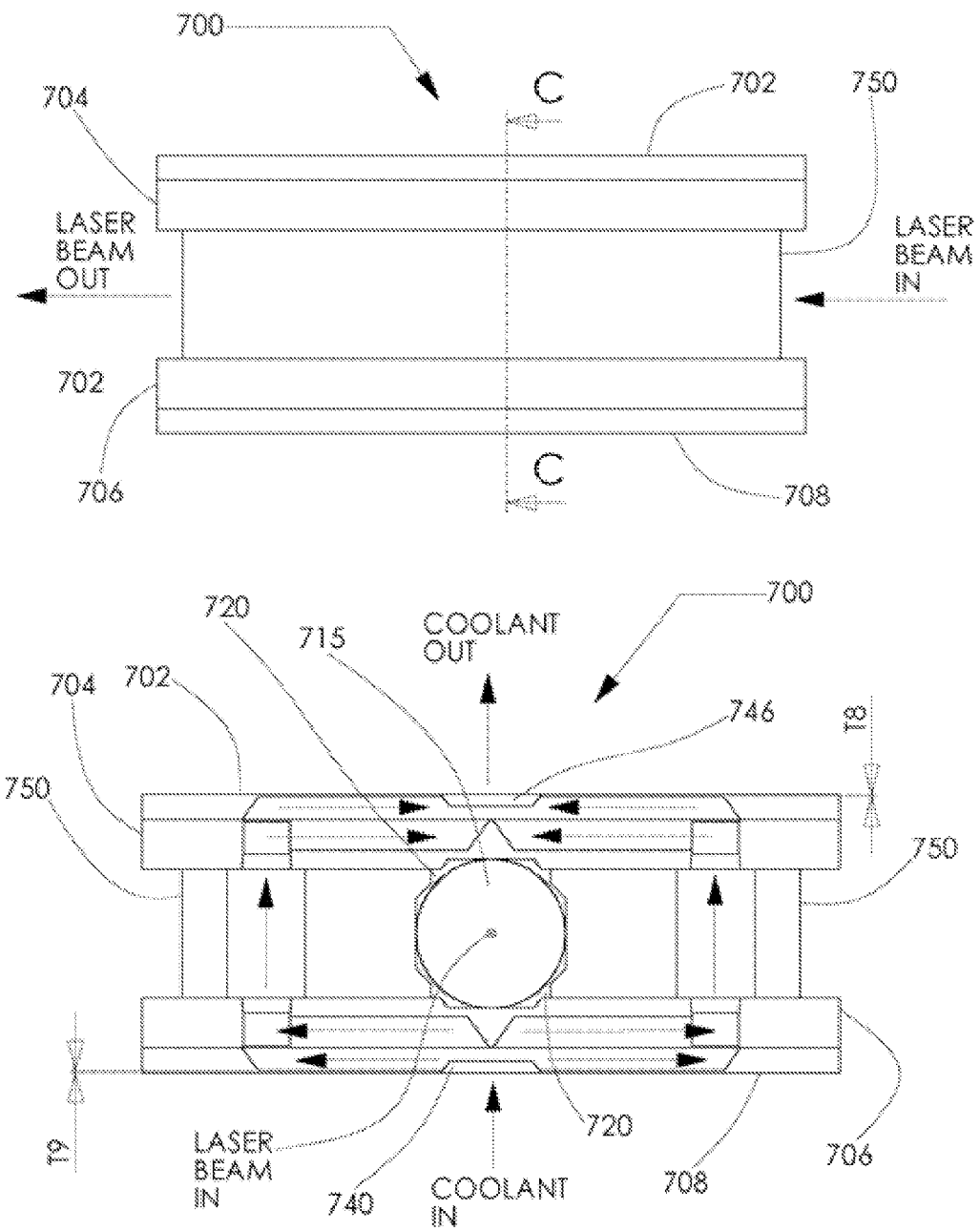
FIG. 8 illustrates a side view and a cross-sectional view of the silicon-based thermal energy transfer device of FIG. 7.
Figure 9:
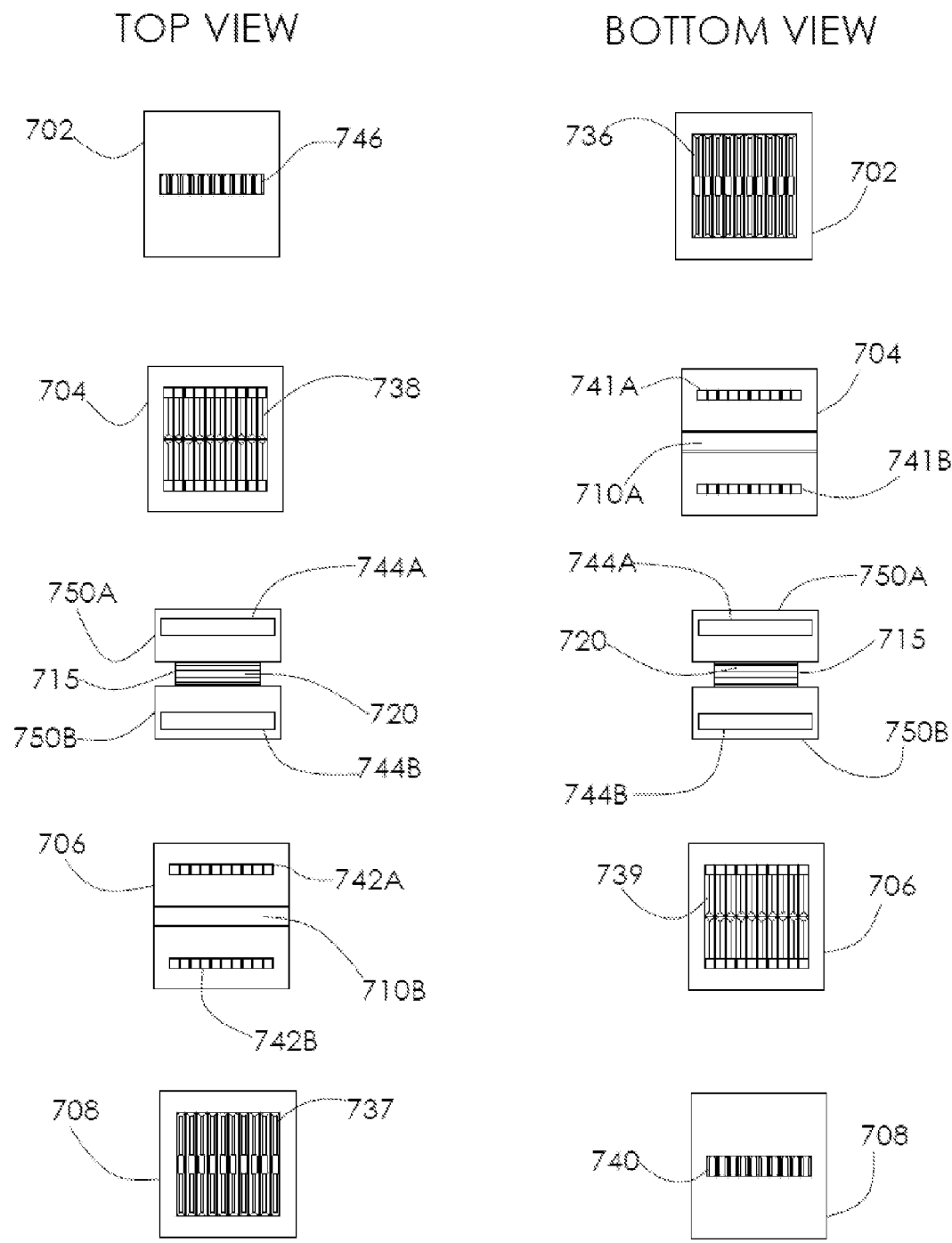
FIG. 9 illustrates a top view and a bottom view of the silicon-based thermal energy transfer device of FIG. 7.

FIGS. 7-9 illustrate various views of a silicon-based thermal energy transfer device 700 for a right circular cylinder-shaped gain medium crystal 715 of a laser system in accordance with one non-limiting embodiment. The device 700 includes a first half structure 702, a second half structure 704, a third half structure 706, a fourth half structure 708, a first conduit element 750a, and a second conduit element 750b. Each of the first half structure 702, second half structure 704, third half structure 706, and fourth half structure 708 is made of silicon. In one embodiment, each of the first half structure 702, second half structure 704, third half structure 706, and fourth half structure 708 is metal-plated with a metal such as, for example, gold.

In one embodiment, each of the first half structure 702, second half structure 704, third half structure 706, and fourth half structure 708 is fabricated from a respective silicon wafer using semiconductor fabrication technology including photolithography, dry etch, wet etch, etc. In one embodiment, the first half structure 702 and the fourth half structure 708 are identical, and therefore can be made by the same fabrication process and even be from the same silicon wafer. Likewise, in one embodiment, the second half structure 704 and the third half structure 706 are identical, and therefore can be made by the same fabrication process and even be from the same silicon wafer.

The first half structure 702 has a row of openings 746 as coolant outlet ports. As shown in FIG. 9, on one of the two primary surfaces of the first half structure 702, there are grooves 736 each of which associated with a respective one of the openings 746. The second half structure 704 has a first row of openings 741a and a second row of openings 741b as coolant inlet ports. As shown in FIG. 9, on one of the two primary surfaces of the second half structure 704, there are grooves 738 each of which connecting a respective pair of one of the openings 741a and one of the openings 741b. The primary surface of the second half structure 704 opposite the primary surface that has the grooves 738 has a groove between the rows of openings 741a and 741b to accommodate the crystal 715.

In one embodiment, the thinnest part of the first half structure 702 where the grooves 736 are, denoted as thickness T8 in FIG. 8, is approximately a range of 100 to 200 μm.

The fourth half structure 708 has a row of openings 740 as coolant inlet ports. As shown in FIG. 9, on one of the two primary surfaces of the fourth half structure 708, there are grooves 737 each of which associated with a respective one of the openings 740. The third half structure 706 has a first row of openings 742a and a second row of openings 742b as coolant outlet ports. As shown in FIG. 9, on one of the two primary surfaces of the third half structure 706, there are grooves 739 each of which connecting a respective pair of one of the openings 742a and one of the openings 742b. The primary surface of the third half structure 706 opposite the primary surface that has the grooves 739 is substantially flat to provide surface area to contact with the corresponding primary surface of the crystal 715.

In one embodiment, the thinnest part of the fourth half structure 708 where the grooves 737 are, denoted as thickness T9 in FIG. 8, is approximately a range of 100 to 200 μm.

As shown in FIGS. 7 and 8, the first half structure 702 and the second half structure 704 together form a first manifold. The third half structure 706 and the fourth half structure 708 together form a second manifold. The first half structure 702 and the second half structure 704 may be affixed to each other by solder, silicon-to-gold eutectic bonding, or silicon-to-silicon bonding. The third half structure 706 and the fourth half structure 708 may be affixed to each other by solder, silicon-to-gold eutectic bonding, or silicon-to-silicon bonding.

The first conduit element 750a has a cavity 744a. The second conduit element 750b has a cavity 744b. When the first and second conduit elements 750a and 750b are coupled between the first manifold formed by the first and second half structures 702 and 704 and the second manifold formed by the third and fourth half structures 706 and 708, the cavities 744a and 744b allow a coolant to flow through the first and second conduit elements 750a and 750b from the openings 742a and 742b, which are the coolant outlet ports of the second manifold formed by the third half structure 706 and the fourth half structure 708, to the openings 741a and 741b, which are the coolant inlet ports of the first manifold formed by the first half structure 702 and the second half structure 704. In one embodiment, one or both of the first and second conduit elements 750a and 750b are made of a metal-based material such as, for example, copper, aluminum, or stainless steel. In one embodiment, one or both of the first and second conduit elements 750a and 750b are made of a ceramic or silicon material.

As shown in FIGS. 7 and 8, when the right circular cylinder-shaped crystal 715 is mounted between the first manifold formed by the first and second half structures 702 and 704, the second manifold formed by the third and fourth half structures 706 and 708, and the first and second conduit elements 750a and 750b, the side of the crystal 715 is in contact with the device 700, leaving the two circular primary surfaces of the crystal 715 exposed to allow a laser beam to shine through. A filler material 720 fills the gap of space between the crystal 715, the first and second half structures 702 and 704, the second manifold formed by the third and fourth half structures 706 and 708, and the first and second conduit elements 750a and 750b. The filler material 720 has high thermal conductivity and promotes the transfer of thermal energy from the crystal 715 to the device 700. In one embodiment, the filler material 720 is a soft solder, indium, silver glass, or thermal epoxy.

Figure 12:
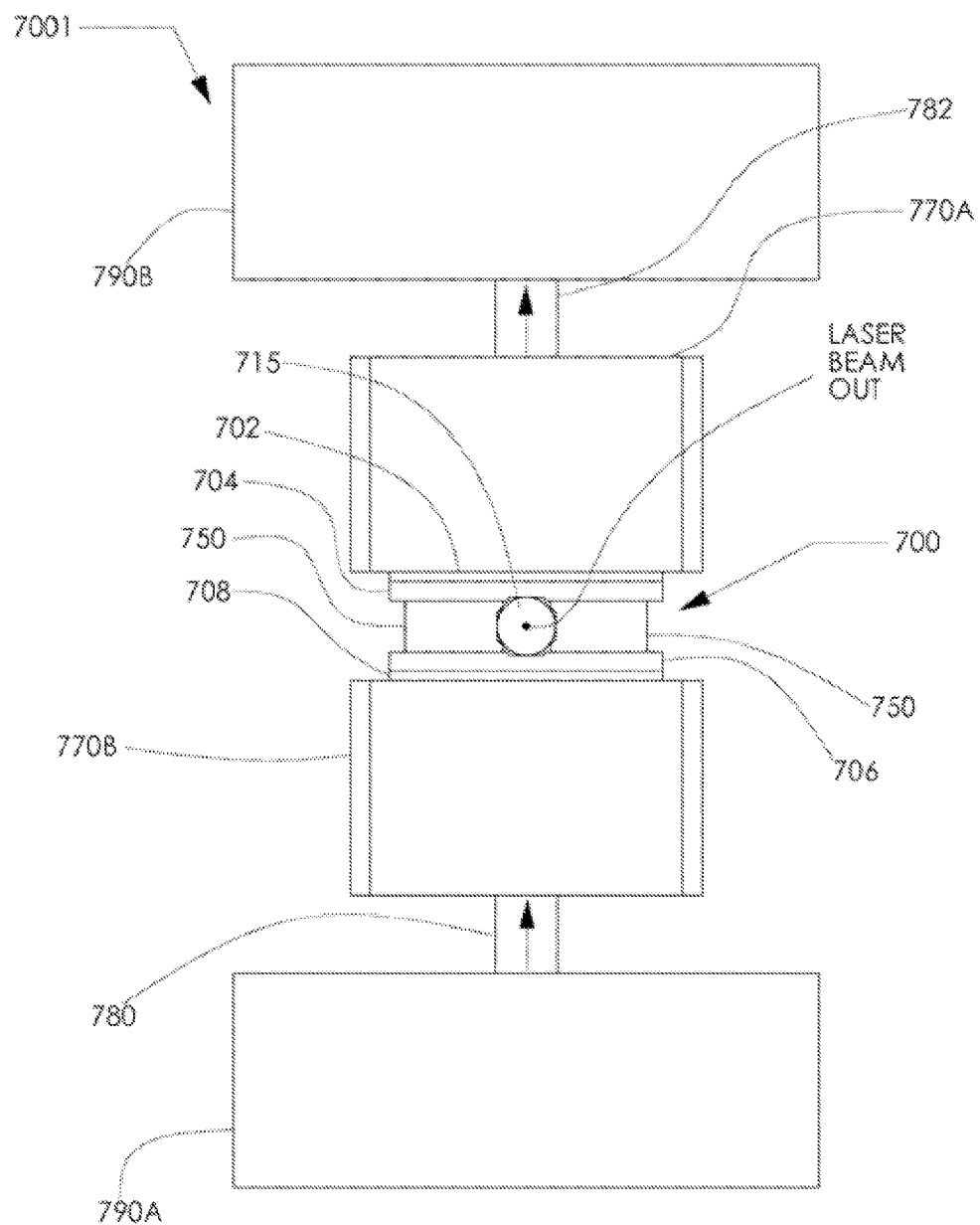
FIG. 12 illustrates a third thermal energy transfer apparatus that includes the silicon-based thermal energy transfer device of FIGS. 7-9 in accordance with one non-limiting embodiment.

FIG. 12 illustrates a thermal energy transfer apparatus 7001 that includes the silicon-based thermal energy transfer device 700 in accordance with one non-limiting embodiment. The apparatus 7001 includes an inbound coolant tubing 780, an outbound coolant tubing 782, a first adapter 770a, and a second adapter 770b.

The first adapter 770a has a first side coupled to the first side of the first manifold, formed by the first and second half structures 702 and 704, and a second side coupled to the outbound coolant tubing 782. The first adapter 770a has an internal coolant flow channel to allow the coolant to flow from the first manifold to the outbound coolant tubing 782 through the first adapter 770a. The second adapter 770b has a first side coupled to the first side of the second manifold, formed by the third and fourth half structures 706 and 708, and a second side coupled to the inbound coolant tubing 780. The second adapter 770b has an internal coolant flow channel to allow the coolant to flow from the inbound coolant tubing 780 to the second manifold through the second adapter 770b.

Each of the inbound coolant tubing 780, outbound coolant tubing 782, first adapter 770a, and second adapter 770b is respectively made of a non-corrosive material. In one embodiment, each of the inbound coolant tubing 780 and outbound coolant tubing 782 is respectively made of stainless steel, a nickel-plated metallic material, a gold-plated metallic material, or a ceramic material. In one embodiment, at least one of the first adapter 770a and second adapter 770b is made of a ceramic material. The materials that the inbound coolant tubing 780, outbound coolant tubing 782, first adapter 770a, and second adapter 770b are made of cannot be plastics or any material subject to corrosion when exposed to water. Chemicals leaching out of plastics or particles coming off of a material due to corrosion, when any of the inbound coolant tubing 780, outbound coolant tubing 782, first adapter 770a, or second adapter 770b is made of plastics or a corrosive material, will likely foul or clog up the internal coolant flow channels of the first manifold formed by the first and second half structure 702 and 704 as well as the internal coolant flow channels of the second manifold formed by the third and fourth half structures 706 and 708.

In one embodiment, the inbound coolant tubing 780 and the outbound coolant tubing 782 are respectively coupled to the second adapter 770b and the first adapter 770a by solder, press-fit, epoxy bonding, or single-body machining. In one embodiment, the first and second adapters 770a and 770b are coupled to the device 700 by solder, press-fit, epoxy bonding, or single-body machining.

In one embodiment, the apparatus 7001 includes a coolant supplier 790a coupled to the inbound coolant tubing 780 to supply the coolant at a first temperature range, and a coolant receiver 790b coupled to the outbound coolant tubing 782 to receive the coolant at a second temperature range that is higher than the temperature range. In an alternative embodiment, the coolant supplier 790a and the coolant receiver 790b are part of a single heat exchanger system.

Conclusion

The above-described techniques pertain to silicon-based thermal energy transfer for the gain medium of a laser system. Although the techniques have been described in language specific to structural features and/or methodological acts, it is to be understood that the appended claims are not necessarily limited to the specific features or acts described. Rather, the specific features and acts are disclosed as exemplary forms of implementing such techniques. Furthermore, although the techniques have been described in the context of laser systems using laser diodes, the techniques may be applied in any other suitable context.

What is claimed is:

1. A thermal energy transfer apparatus that removes thermal energy from a disk-shaped gain medium crystal of a laser system, the apparatus comprising:

a silicon-based manifold that has internal coolant flow channels, a first side, and a second side opposite the first side, wherein:

the first side includes coolant inlet ports and coolant outlet ports communicatively connected to the internal coolant flow channels, and the second side is substantially flat to provide surface area to contact with a first primary surface of the crystal; and a silicon-based cover element that has an opening to expose a portion of a second primary surface of the crystal that is opposite the first primary surface of the crystal when the crystal is mounted between the cover element and the manifold, wherein the cover element comprises:
  a first plate made of silicon, the first plate having an opening smaller than an area of the second primary surface of the crystal to expose a portion of the second primary surface of the crystal; and
  a second plate made of silicon, the second plate having an opening larger than the area of the second primary surface of the crystal and shaped to at least partially circumscribe the crystal with the crystal contacting a plurality of points of the opening of the second plate when the crystal is mounted between the cover element and the manifold.

2. The apparatus of claim 1, wherein the manifold comprises:
  a first half structure made of silicon, the first half structure having a first primary surface that is the first side of the manifold and a second primary surface opposite the first primary surface, the first half structure having openings as the coolant inlet ports and the coolant outlet ports of the manifold, the second primary surface having grooves that form a first half of the internal coolant flow channels of the manifold; and
  a second half structure made of silicon, the second half structure having a first primary surface that is the second side of the first manifold and a second primary surface opposite the first primary surface, the second primary surface having grooves that form a second half of the internal coolant flow channels of the manifold.

3. The apparatus of claim 1, further comprising:
a layer of synthetic diamond on the second side of the manifold to be in direct contact with the crystal when the crystal is mounted between the manifold and the cover element.

4. The apparatus of claim 1, further comprising:
a plurality of nanotubes on the second side of the manifold to be in direct contact with the crystal when the crystal is mounted between the manifold and the cover element.

5. The apparatus of claim 1, further comprising:
an inbound coolant tubing made of a metallic or ceramic material;
an outbound coolant tubing made of a metallic or ceramic material;
an adapter made of a ceramic material, the adapter having a first side coupled to the first side of the manifold and a second side coupled to the inbound coolant tubing and the outbound coolant tubing, the adapter having an inbound coolant flow channel to allow the coolant to flow from the inbound coolant tubing to the manifold through the adapter, the adapter further having an outbound coolant flow channel to allow the coolant to flow from the manifold to the outbound coolant tubing through the adapter; and
a heat exchanger system coupled to the outbound coolant tubing and the inbound coolant tubing, the heat exchanger system supplying the coolant to the inbound coolant tubing and receiving the coolant from the outbound coolant tubing to remove thermal energy from the coolant.

* * * * *